United States Patent
Teo et al.

(10) Patent No.: US 10,212,625 B2
(45) Date of Patent: Feb. 19, 2019

(54) INTELLIGENT MOBILE DATA OFFLOADING

(71) Applicant: ADVANCED NETWORK TECHNOLOGY LABORATORIES PTE LTD, Singapore (SG)

(72) Inventors: Wee Tuck Teo, Singapore (SG); Teck Kang Toh, Singapore (SG)

(73) Assignee: ADVANCED NETWORK TECHNOLOGY LABORATORIES PTE LTD, Singapore (SG)

( * ) Notice: Subject to any disclaimer, the term of this patent is extended or adjusted under 35 U.S.C. 154(b) by 289 days.

(21) Appl. No.: 14/898,714

(22) PCT Filed: Jun. 17, 2014

(86) PCT No.: PCT/SG2014/000287
§ 371 (c)(1),
(2) Date: Dec. 15, 2015

(87) PCT Pub. No.: WO2014/204404
PCT Pub. Date: Dec. 24, 2014

(65) Prior Publication Data
US 2016/0142940 A1 May 19, 2016

Related U.S. Application Data

(60) Provisional application No. 61/836,063, filed on Jun. 17, 2013.

(51) Int. Cl.
| | | |
|---|---|---|
| H04W 48/18 | (2009.01) | |
| H04W 28/08 | (2009.01) | |
| H04W 16/32 | (2009.01) | |
| H04W 48/20 | (2009.01) | |
| H04L 5/00 | (2006.01) | |
| H04W 36/22 | (2009.01) | |
| H04W 72/08 | (2009.01) | |

(52) U.S. Cl.
CPC .......... *H04W 28/085* (2013.01); *H04L 5/006* (2013.01); *H04W 16/32* (2013.01); *H04W 28/08* (2013.01); *H04W 36/22* (2013.01); *H04W 48/18* (2013.01); *H04W 48/20* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 2006/0015596 A1* | 1/2006 | Mar | ............... | H04L 29/1232 709/222 |
| 2009/0156213 A1* | 6/2009 | Spinelli | ............... | H04W 92/02 455/436 |
| 2013/0014263 A1* | 1/2013 | Porcello | ............... | H04L 63/0272 726/25 |

FOREIGN PATENT DOCUMENTS

| | | |
|---|---|---|
| WO | 2007/008574 A2 | 1/2007 |
| WO | 2011/149533 A1 | 12/2011 |

* cited by examiner

*Primary Examiner* — Mark H Rinehart
*Assistant Examiner* — Angel T Brockman
(74) *Attorney, Agent, or Firm* — Maschoff Brennan (57) ABSTRACT

A method for offloading mobile data may include determining a micro-cell performance parameter associated with a micro-cell of a mobile communication system. Further, the method may include determining whether to offload mobile data operations to a micro-cell access point that corresponds to the micro-cell based on the micro-cell performance parameter.

39 Claims, 2 Drawing Sheets

INTELLIGENT MOBILE DATA OFFLOADING

FIELD

The embodiments discussed herein are related to intelligent mobile data offloading.

BACKGROUND

An increasing amount of data is accessed via mobile devices such as smartphones and tablets. Accordingly, carriers that provide mobile communication services to these mobile devices are increasingly using small cell Wireless Local Area Networks (WLAN), such as Wireless Fidelity (Wi-Fi) networks, to offload data usage by the mobile devices to help satisfy the demand and increase the overall capacity of the associated mobile communication network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method for offloading mobile data may include determining a micro-cell performance parameter associated with a micro-cell of a mobile communication system. Further, the method may include determining whether to offload mobile data operations to a micro-cell access point that corresponds to the micro-cell based on the micro-cell performance parameter.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to some embodiments of the present disclosure, intelligent offloading of mobile data operations may be performed to improve a user experience associated with performing mobile data operations. For example, carriers that provide mobile communication services to mobile devices are increasingly using small cell Wireless Local Area Networks (WLAN), such as Wi-Fi networks, to offload data usage by the mobile devices to help satisfy the demand and increase the overall capacity of the associated mobile communication network. However, in some instances the user experience may be better achieved by not offloading the mobile communication services to the small cells. Therefore, as detailed below, intelligent offloading may be performed to determine whether or not to offload the mobile communication services.

Embodiments of the present disclosure will be explained with reference to the accompanying drawings.

Figure 1:
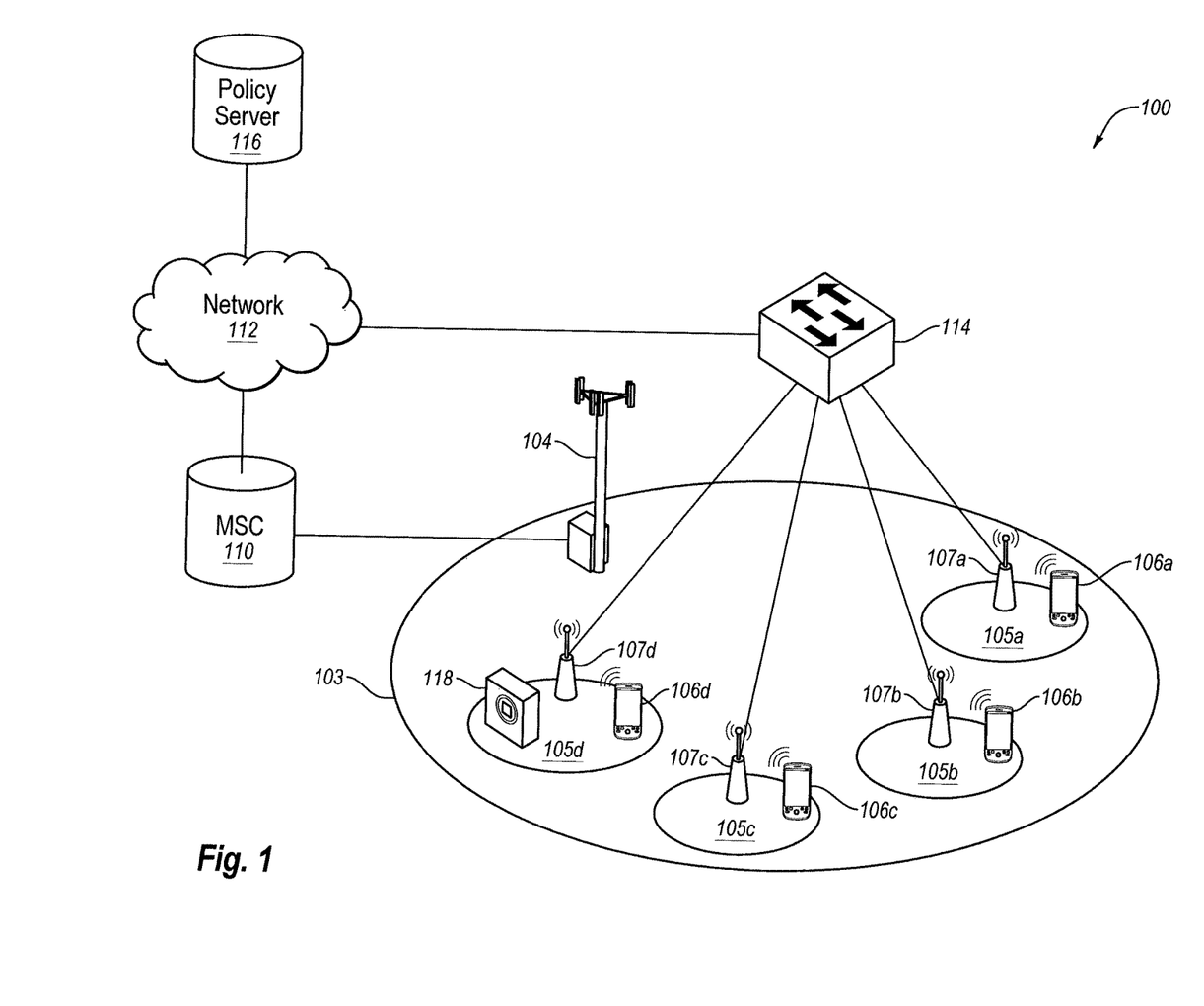
FIG. 1 illustrates an example mobile communication system.

FIG. 1 illustrates an example mobile communication system 100 (referred to hereinafter as the "system 100"), arranged in accordance with at least one embodiment described herein. The system 100 may be configured to provide mobile communication services to one or more terminals 106. In the illustrated embodiment, the system 100 is depicted as including terminals 106a, 106b, 106c, and 106d, however the system 100 may include any number of terminals 106.

The mobile communication services provided by the system 100 may include voice services, data services, messaging services, and/or any suitable combination thereof. The system 100 may include a Frequency Division Duplexing (FDD) network, a Frequency Division Multiple Access (FDMA) network, an Orthogonal FDMA (OFDMA) network, a Code Division Multiple Access (CDMA) network, a Time Division Multiple Access (TDMA) network, a Direct Sequence Spread Spectrum (DSSS) network, a Frequency Hopping Spread Spectrum (FHSS) network, and/or some other wireless communication network. In some embodiments, the system 100 may be configured to perform quadrature-based modulation. Additionally, in some embodiments, the system 100 may be configured to operate as a second generation (2G) wireless communication network, a third generation (3G) wireless communication network, a fourth generation (4G) wireless communication network, and/or a Wi-Fi network. In these or other embodiments, the system 100 may be configured to operate as a Long Term Evolution (LTE) wireless communication network.

A terminal 106 may include any device that may use the system 100 for obtaining wireless communication services and may also be referred to as a mobile device, a remote station, a mobile station, an access terminal, user equipment (UE), a wireless communication device, a cellular phone, or some other terminology. For example, a terminal 106 may include, by way of example and not limitation, a cellular phone, a smartphone, a personal data assistant (PDA), a laptop computer, a personal computer, a tablet computer, a wireless communication card; or any other similar device configured to communicate within the system 100.

A terminal 106 may or may not be capable of receiving signals from one or more satellites (not expressly illustrated in FIG. 1). In some embodiments, the satellites may belong to a satellite positioning system such as the well-known Global Positioning System (GPS). Additionally, a terminal 106 may also be capable of receiving signals from other types of transmitting sources such as a Bluetooth transmitter, a wireless local area network (WLAN) transmitter, an IEEE 802.11 (e.g., Wi-Fi) transmitter, any one of the above-referenced network transmitters, and any other suitable transmitter.

In some embodiments, the system 100 may include one or more macro-cells that may be serviced by one or more macro-cell access points. For example, the illustrated embodiment includes a macro-cell 103 that may be serviced by a macro-cell access point 104. The macro-cell access point 104 may be configured to provide mobile communication services to the terminals 106 that may be within the macro-cell 103.

The macro-cell access point 104 may be any suitable mobile network communication point that may provide mobile communication services to the terminals 106. The macro-cell access point 104 may include, by way of example but not limitation, a base station, a remote radio head (RRH), a Node B, an evolved Node B (eNB), or any other suitable communication point. In some embodiments, a mobile switching center (MSC) 110 may be communicatively coupled to the macro-cell access point 104 and may provide coordination and control for the macro-cell access point 104 with other access points (e.g., other macro-cell access points as well as micro-cell access points) as well as access to a network 112, which in some embodiments may be the Internet.

Additionally, in some embodiments, the system 100 may include one or more micro-cells such as micro-cells 105a-105d. The micro-cells 105 may each be serviced by a corresponding micro-cell access point 107, which may provide mobile communication services to the terminals 106 that may be found within the respective micro-cells 105. For example, the micro-cell 105a may be serviced by a micro-cell access point 107a, the micro-cell 105b may be serviced by a micro-cell access point 107b, the micro-cell 105c may be serviced by a micro-cell access point 107c, and the micro-cell 105d may be serviced by a micro-cell access point 107b.

In some embodiments, the micro-cells 105 may be included in the macro-cell 103 and may also be configured to provide mobile communication services to terminals 106 that may be found within the respective micro-cells 105. For example, the micro-cell access point 107a may provide mobile communication services to the terminal 106a that may be found in the micro-cell 105a.

The micro-cell access points 107 may be any suitable network communication point that may provide mobile communication services to the terminals 106 using the protocols and/or frequencies associated with the micro-cells 105. For example, the micro-cell access points 107 may be wireless radios and/or routers configured to operate according to Wi-Fi standards and frequencies. In some embodiments, an access controller 114 may be communicatively coupled to the micro-cell access points 107 and may provide coordination and control for communications by the micro-cell access points 107 with the terminals 106 as well as coordination and control between the micro-cell access points 107 with each other and/or with the macro-cell access point 104. The access controller 114 may also provide access to the network 112.

In some embodiments, the micro-cell access points 107 may be configured to operate in a different communication protocol and/or frequency range than the macro-cell access point 104 such that communications between terminals 106 and a micro-cell access points 105 may not interfere with communications between terminals 106 and the macro-cell access point 104. For example, in some embodiments, the macro-cell access point 104 may be configured to perform communications with the terminals 106 via 2G, 3G, 4G, and/or 4G LTE protocols and frequencies and the micro-cell access points 107 may be configured to perform communications with the terminals 106 via Wi-Fi protocols and frequencies. Accordingly, the micro-cell access point communications may not substantially interfere with the macro-cell access point communications and vice versa.

In some embodiments, the micro-cells 105 may be configured to increase the capacity of the system 100 by offloading data consuming operations and services provided to the terminals 106 from the macro-cell access point 104 to the micro-cell access points 105. Additionally, in some embodiments, the system 100 may include a policy server 116 configured to manage the offloading to the micro-cell access points 107.

As discussed in further detail below, the policy server 116 may be configured to determine whether to offload the data consuming operations to the micro-cell access points 107 based on one or more micro-cell performance parameters. The micro-cell performance parameters may indicate how quickly and effectively the associated micro-cells 105 and micro-cell access points 107 may perform data operations. For example, the micro-cell performance parameters may include, but are not limited to, the quality of communications between one or more of the micro-cell access points 107 and the terminals 106 (referred to also as "micro-cell communications"), the number of terminals 106 being serviced by a micro-cell access point 107, the overall capacity of the micro-cell access point 107, the signal to noise ratio (SNR) of the micro-cell communications, the latency associated with micro-cell communications, and/or any other applicable indicator of micro-cell communication quality.

In these or other embodiments, the policy server 116 may also be configured to offload the data consuming operations based on one or more macro-cell performance parameters. The macro-cell performance parameters may indicate how quickly and effectively the macro-cell 103 and the macro-cell access point 104 may perform data operations. For example, the micro-cell performance parameters may include, but are not limited to, the quality of communications between the macro-cell access points 104 and the terminals 106 (referred to also as "macro-cell communications"), the number of terminals 106 being serviced by the macro-cell access point 104, the overall capacity of the macro-cell access point 104, the signal to noise ratio (SNR) of the macro-cell communications, the latency associated with macro-cell communications, and/or any other applicable indicator of the macro-cell communication quality.

In some embodiments, the policy server 116 may determine offloading by comparing the micro-cell performance parameters with the macro-cell performance parameters to determine whether data operations associated with one or more of the terminals 106 should be performed via the macro-cell access point 104 or one or more of the micro-cell access points 107. The policy server 116 may be configured to make the above determination based on whether the macro-cell 103 and macro-cell access point 104 may perform the data operations more effectively (e.g., faster) than an applicable micro-cell 105 and its associated micro-cell access point 107.

For example, in some embodiments, the policy server 116 may determine that the latency associated with the macro-cell communications between the macro-cell access point 104 and the terminal 106a may be less than the latency associated with the micro-cell communications between the micro-cell access point 107a and the terminal 106a such that the terminal 106a may be better served by performing data operations via the macro-cell access point 104 instead of the micro-cell access point 106. The policy server 116 may accordingly direct the access controller 114, micro-cell access point 107a and/or the macro-cell access point 104 to perform operations such that the terminal 106a may perform the associated data operations via the macro-cell access point 104. In contrast, traditional systems and methods associated with offloading may instead instruct terminals to always perform data operations with respect to a micro-cell access point if the terminals are within range of the micro-cell access point, regardless of the quality of the micro-cell communications. A more detailed description of the offloading decision making is explained further below.

The policy server 116 may include any system, device, or apparatus configured to perform the operations of the policy server 116. In some embodiments, the policy server may include one or more microprocessors, microcontrollers, digital signal processors (DSP), application-specific integrated circuits (ASIC), a Field Programmable Gate Array (FPGA), or any other digital or analog circuitry configured to interpret and/or to execute program instructions and/or to process data and/or signals. In some embodiments, the program instructions and/or process data may be stored in memory associated with the policy server 116.

The memory may include any suitable computer-readable media configured to retain program instructions and/or data for a period of time. By way of example, and, not limitation, such computer-readable media may include tangible and/or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other tangible and/or non-transitory storage medium which may be used to carry or store desired program code in the form of computer-executable instructions or data structures and which may be accessed by the processor. Combinations of the above may also be included within the scope of computer-readable media. Computer-executable instructions may include, for example, instructions and data that cause a general purpose computer, a special purpose computer, or a special purpose processing device (e.g., a processor) to perform a certain function or group of functions.

In some embodiments, the access controller 114 may control the authorization and access of the terminals 106 to the micro-cell access points 107. Accordingly, in some embodiments, when micro-cell performance parameters indicate that macro-cell communication may be used instead of micro-cell communication to improve data services, the policy server 116 may instruct the access controller 114 to revoke authorization of the applicable terminals 106 with respect to the applicable micro-cell access points 107. In these or other embodiments, the access controller 114 may not allow more terminals 106 to authenticate with the applicable micro-cell access points 107 in addition to, or instead of revoking authorization. For example, In some embodiments, the terminals 106 may be configured to perform communications with the macro-cell access point 104 when micro-cell communications are denied or terminated such that when the terminals 106 are kicked off or denied communication via an applicable micro-cell access point 107, the terminals 106 may perform operations via the macro-cell 103 and the macro-cell access point 104.

In some embodiments, the system 100 may include a performance sensor 118 configured to monitor one or more macro-cell characteristics and/or one or more micro-cell characteristics. In some embodiments, the performance sensor 118 may be placed inside of the macro-cell 103 and one of the micro-cells 105 such that the performance sensor 118 may monitor the macro-cell characteristics and the micro-cell characteristics of the micro-cell 105 in which it may be placed. In the illustrated embodiment, the performance sensor 118 may be placed inside the micro-cell 105*d* such that the performance sensor 118 may monitor the characteristics of the macro-cell 103 and the micro-cell 105*d*. In some embodiments, each micro-cell 105 may include a performance sensor 118 placed therein. In other embodiments, fewer than all the micro-cells 105 may include a performance sensor 118 included therein. For example, the micro-cells 105 with the highest amount of use may each include a performance sensor 118, while the micro-cells 105 with a relatively low amount of use may not include a performance sensor 118. In alternative embodiments, the performance sensor 118 may be placed inside of the macro-cell 103, but may not be placed inside a micro-cell 105 such that the performance sensor 118 may monitor the macro-cell characteristics but not any micro-cell characteristics.

Some of the cell (micro or macro) characteristics that the performance sensor 118 may be configured to monitor may include achievable bandwidth, latency, SNR, and signal strength. The performance sensor 118 may also be configured to monitor the minimum and maximum values of the characteristics to help better ascertain the capabilities of the macro-cell 103 and/or the micro-cell 105*d*. The performance sensor 118 may be communicatively coupled to the policy server 116 via any, suitable mechanism and, in some embodiments, may report the monitored characteristics to the policy server 116. For example, in some embodiments, the performance sensor 118 within the micro-cell 105*d* may use a Wi-Fi connection provided by the micro-cell access point 107*d* or a connection provided by the macro-cell access point 104 to communicate the monitored characteristics to the policy server 116. In these and other embodiments, the policy server 116 may determine one or more of the performance parameters. In some embodiments, the performance sensor 118 may determine one or more of the performance parameters based on the monitored characteristics and may communicate the determined performance parameters to the policy server 116.

Additionally, in some embodiments, a terminal 106 may include an application configured to perform the operations of the performance sensor 118. Accordingly, the terminal 106 may also monitor the cell characteristics of the cells (macro and/or micro) where the terminal 106 may be located. In some embodiments, the terminal 106 may be configured to determine the performance parameters of the macro-cell 103 and/or the applicable The terminal 106 may also be configured to report the cell characteristics and/or performance to the policy server 116.

In some instances deploying a large number of performance sensors 118 may be impractical or expensive. Accordingly, in some instances the system 100 may be configured to determine one or more performance parameters associated with the micro-cells 105 and/or the macro-cell 103 without the use of a performance sensor 118. For example, in some embodiments, the latency of data operations may be determined without the use of a performance sensor 118.

In some embodiments, the policy server 116 may be communicatively coupled to the macro-cell access point 104 (e.g., via the MSC 110) and the micro-cell access points 107 (e.g., via the access controller 114) over the network 112 via a wired and switched connection. The wired and switched connection may be configured in such a manner that variations in latency between the policy server 116 and the access points (micro or macro) may be relatively short and may be relatively consistent. However, depending on the varying performance parameters associated with the macro-cell 103 and the micro-cells 105, the latency between the access points and the terminals 106 may be significantly greater and may also vary significantly. Accordingly, a device configured to determine and track the latency delay time and variations in latency with respect to the macro-cell 103 and/or the micro-cells 105 may determine the communication quality associated with the various cells, which may be used to determine whether to offload data operations to the micro-cells 105. In some embodiments, the policy server 116 may be configured to determine the latency associated with the macro-cell 103 and/or one or more of the micro-cells 105 to determine whether or not to offload data operations to the micro-cells 105.

In some embodiments, the policy server 116 may determine the latency by monitoring control plane (e.g., authentication) data associated with authenticating the terminals 106. For example, the latency of the micro-cell 105a may be determined by monitoring Extensible Authentication Protocol (EAP) messages between the terminal 106a, the micro-cell 105a, the access controller 114 and the policy server 116. As indicated above, variations in latency in the authentication may most likely correlate with variations in connectivity and performance associated with the micro-cell 105a such that tracking the latency in authentication may also indicate performance associated with the micro-cell 105a. For example, the latency variations may indicate changes in signal strength, distance of the terminal 106a from the micro-cell access point 105a, congestion of the micro-cell 105a. Accordingly, based on the latency variations, the policy server 116 may be configured to determine performance of the micro-cell 105a to determine whether or not to offload data operations to the micro-cell 105a.

In these or other embodiments, the latency may be, monitored via a data plane associated with the system 100. For example, in some embodiments, the policy server 116 may instruct the access controller 114 and/or the micro-cell access point 107a to ping (e.g., via unicast Address Resolution Protocol (ARP) pinging) the terminal 106a to determine latency associated with communications performed via the micro-cell 105a. The pinging may be done on a fairly regular basis such that the latency may be monitored over time to determine when the latency is relatively low and when the latency is relatively high. Similar operations may be performed with respect to the other micro-cells 105. Additionally, analogous operations may be performed with respect to latency associated with the macro-cell 103.

In some embodiments, accuracy of the latency monitoring may be improved by adding an additional monitoring parameter. For example, as indicated above, the latency on the wired connections may be relatively small and consistent with respect to the latency associated with the cells (micro or macro). The wired latency may accordingly be known to a relatively accurate degree and may thus be subtracted from the determined latency. Accordingly, the determined latency values may indicate the latency in the cells. Additionally, in some embodiments, the policy server 116 may determine the latency over the wired connection via communications between the policy server 116 and the applicable access points and then the policy server may determine the latency between the policy server 116 and applicable terminals 106. The policy server 116 may accordingly subtract the wired connection latency from the overall latency to determine the latency of the applicable cell.

For example, the policy server 116 may determine a wired latency between the policy server 116 and the micro-cell access point 105a and may also determine an overall latency between the policy server 116 and the terminal 106a. The policy server 116 may, subtract the wired latency from the overall latency, which may indicate the latency associated with the micro-cell 105a.

In some embodiments, the system 100 may determine offloading operations in a manner as described below. In some embodiments, the policy server 116 may be an AAA RADIUS policy server. The policy server 116 may be configured to receive performance indicators from one or more performance sensors 118, one or more terminals 106, and/or based on latency determinations described above. The policy server 116 may also be configured to track the active micro-cell login sessions of the terminals 106.

For example, for EAP based login sessions, the micro-cell access points 107 and/or the access controller 114 may send a Network Access Server (NAS) Internet Protocol (IP)/identifier, and location attribute (e.g. NAS port identifier) to a Wireless Access Gateway (WAG) (not expressly depicted in FIG. 1) which may proxy the request to the policy server 116. The WAG may also have statistics of data associated with each terminal 106 and the associated micro-cell 105 performance which may be monitored by the policy server 116.

In some embodiments, the policy server 116 may include a set of identifiers and mappings that may identify:
1. The micro-cell wireless coverage area of each individual micro-cell access point 107;
2. The macro-cell wireless coverage area of the macro-cell access point 104;
3. The mapping and association of the macro-cell 103 to its associated micro-cells 105;
4. The neighbor relationship of one micro-cell 105 to other overlapping micro-cells 105; and
5. Capacity information of each micro-cell 105.

The raw data consolidated from the various data sources (e.g., performance sensors 118, terminals 106, latency monitoring, etc.) may include:
1. Latency information from the latency monitoring;
2. Additional wireless control and quality info from the performance sensors 118; and
3. Location information of the terminals 106 from the various devices such as the access points, the access controller 114, and/or the WAG to determine which micro-cell 105 the terminals 106 may be are associated with.

From the raw data, the following metric and data summary may be obtained (e.g., by the policy server 116):
1. Latency and quality information associated with a micro-cell 105 may be combined to form a micro-cell latency quality metric for an individual terminal 106 in the applicable micro-cell 105, which may be denoted by "$LQ_{Micro}$".
2. Latency and quality information associated with a macro-cell 103 may be combined to form a macro-cell latency quality metric for an individual terminal 106 in the macro-cell 103, which may be denoted by "$LQ_{Macro}$".
3. The number of terminals 106 in a micro-cell 105, which may be denoted by "$Num_{Micro}$".
4. Average micro-cell latency quality metric of current terminals 106 in a micro-cell 105, which may be denoted by "Avg $LQ_{Micro}$".
5. Average macro-cell latency quality metric of current terminals 106 in the macro-cell 103, which may be denoted by "Avg $LQ_{Macro}$".
6. Running offpeak baseline micro-cell latency quality metric of one or more of the micro-cells 105, which may be denoted by "Baseline $LQ_{Micro}$".
7. Running offpeak baseline macro-cell latency quality metric of the macro-cell 103, which may be denoted by "Baseline $LQ_{Macro}$".

In some embodiments, the policy server 116 may use the above referenced data to adopt a wide variety of methods to determine which mobile offload policies to use. For example, a simple method may be to use the capacity of an applicable micro-cell 105 to determine whether mobile data may be offloaded to the applicable micro-cell 105. In particular, when the number of terminals 106 serviced by the applicable micro-cell 105 is greater than or equal to the capacity latency quality of the applicable micro-cell 105 ($\text{Num}_{Micro}$>=Capacity $\text{LQ}_{Micro}$), the mobile data may not be offloaded to the applicable micro-cell 105.

In these or other embodiments, the policy server 116 may consider the user network quality and variations. For example, the policy server 116 may compare the current micro-cell latency quality (LQ) of an individual terminal 106 to the baseline micro-cell LQ of its associated micro-cell 105. If the difference is above a certain pre-set threshold, the policy server 116 may determine that user experience is poor in the associated micro-cell 105 and may apply a control mechanism to the terminal 106 such that the terminal 106 may perform data operations with respect to the macro-cell 103. In some embodiments, the decision to control data operations of a particular terminal 106 with respect to the macro-cell 103 instead of the respective micro-cell 105 may be performed according to the following expression:

If "$\text{LQ}_{Micro}$-Baseline $\text{LQ}_{Micro}$>threshold" with respect to the particular terminal 106, then perform data operations with respect to the macro-cell 103.

The comparison may also be between on the current micro-cell LQ of the particular terminal 106 to the average micro-cell LQ of the associated micro-cell 105. This may detect that the user experience of the individual terminal 106 is particularly bad as compared to the other terminals 106 that may be also serviced by the associated micro-cell 105 as based on a pre-set threshold. In some embodiments, the decision to control data operations with respect to the macro-cell 103 instead of the associated micro-cell 105 may be performed according to the following expression:

If "$\text{LQ}_{Micro}$-Avg $\text{LQ}_{Micro}$>threshold" with respect to the particular terminal 106, then perform data operations with respect to the macro-cell 103.

Additionally, decision criteria may be based on comparing the average micro-cell LQ of a particular micro-cell 105 to the average macro-cell LQ of its corresponding macro-cell 103. In some embodiments, a certain balancing (e.g., divisor) factor may be used to balance the differences in the macro-cell LQ of the macro-cell 103 and the micro-cell LQ of the particular micro-cell 105. When the running average micro-cell LQ of the particular micro-cell 105 is higher than the running average macro-cell LQ of the macro-cell 103 (after applying the balancing factor), the policy server 116 may apply applicable control mechanisms to the terminals 106 within the particular micro-cell 105 such that the terminals 106 may perform data operations with respect to the macro-cell 103. In some embodiments, the decision to control data operations with respect to the macro-cell 103 instead of the respective micro-cell 105 may be performed according to the following expression:

If "Avg $\text{LQ}_{Micro}$×balancing factor>Avg $\text{LQ}_{Macro}$" then perform data operations with respect to the macro-cell 103.

In some instances, it may not be easy to devise a good balancing factor to compare the average micro-cell LQ of the particular micro-cell 105 to the average macro-cell LQ of the macro-cell 103. Accordingly, in some embodiments, the previous two methods may be combined to determine and compare a difference of the current average micro-cell LQ to the baseline micro-cell LQ (Diff $\text{LQ}_{Micro}$) for each of the micro-cells 105 based on the following expression:

Diff $\text{LQ}_{Micro}$=Avg $\text{LQ}_{Micro}$-Baseline $\text{LQ}_{Micro}$.

The micro-cell 105 with the lower difference or variation may be deemed as the higher quality micro-cell 105, and its corresponding "Diff $\text{LQ}_{Micro}$" may be compared with a difference of the current average macro-cell LQ to the baseline macro-cell LQ (Diff $\text{LQ}_{Macro}$=Avg $\text{LQ}_{Macro}$-Baseline $\text{LQ}_{Macro}$). In some embodiments, the following expressions may be used:

If "Diff $\text{LQ}_{Micro}$×balancing factor>Diff $\text{LQ}_{Macro}$," then perform data operations with respect to the macro-cell 103.

In these and other embodiments, besides comparing the quality of the micro-cells 105 against the macro-cell 103, the policy server may also compare the average micro-cell LQ of a particular micro-cell 105 with respect to the average micro-cell LQs of its neighboring micro-cells 105. If it detects that the average micro-cell LQ or difference in latency of a terminal 106 in the particular micro-cell 105 is bad as compared to the neighboring micro-cells 105, the policy server 116 may attempt to re-balance the latency differences by applying the above-referenced control mechanisms and directing the terminal 106 to connect to one of the neighboring micro-cells 105. In some embodiments, the policy server 116 may perform the operations using the following expressions:

If "Avg $\text{LQ}_{Micro\text{-}A}$>Max(Avg $\text{LQ}_{Micro\ B}$, Avg $\text{LQ}_{Micro\ C}$, Avg $\text{LQ}_{Micro\ D}$)" and/or "Diff $\text{LQ}_{Micro\ A}$>Max(Diff $\text{LQ}_{Micro\ B}$, Diff $\text{LQ}_{Micro\ C}$, Diff $\text{LQ}_{Micro\ D}$), then offload one or more terminals 106 from the micro-cell 105 "A" to one or more of micro-cells 105 "B," "C," and "D" where micro-cells 105 "B," "C," and "D" are neighbors to micro-cell 105 "A."

Additionally, in some embodiments, the micro-cells 105 may have a minimum performance threshold associated with the micro-cell performance factors where the offloading may not be performed when one or more of the micro-cell performance parameters associated with the micro-cells 105 are below the minimum performance threshold. Further, in these or other embodiments, the macro-cell performance indicators (e.g., determined macro-cell latencies) may be compared with the micro-cell performance indicators (e.g., determined micro-cell latencies) to determine whether to offload the data operations.

By using the methods described above to compare the micro and/or macro-cell performance to determine which data operation offload policy to use; the user experience of a terminal 106 may be improved. Modifications, additions, or omissions may be made to FIG. 1 without departing from the scope of the present disclosure. For example, the number of terminals 106 included in the macro-cell 103 or the various micro-cells 105 may vary according to particular times and scenarios. Additionally, although particular protocols are discussed, the concepts described herein may use any appropriate protocol that may achieve the purposes and results described herein. Additionally, the functionality described with respect to specific devices of the system 100 is not necessarily limited to those particular devices.

Figure 2:
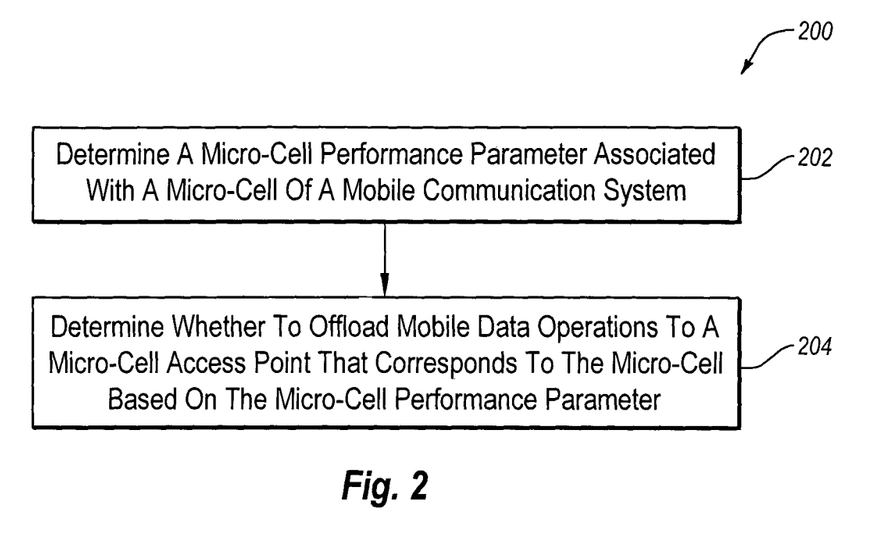
FIG. 2 illustrates a flowchart of an example method of performing intelligent mobile data offloading.

FIG. 2 is a flowchart of an example method 200 of performing intelligent mobile data offloading. In some embodiments, the method 200 may be implemented by a mobile communication system, such as the system 100 of FIG. 1. Although illustrated as discrete blocks, various blocks may be divided into additional blocks, combined into fewer blocks, or eliminated, depending on the desired implementation.

The method 200 may begin at block 202 where a micro-cell performance parameter associated with a micro-cell of a mobile communication system may be determined. In some embodiments, the micro-cell performance parameter may include one or more of: a quality of communications between the micro-cell access point and one or more wireless devices, a number of wireless devices being serviced by the micro-cell access point, an overall capacity of the micro-cell access point, a signal to noise ratio (SNR) of micro-cell communications between the micro-cell access point and the one or more wireless devices, and a latency associated with micro-cell communications between the micro-cell access point and the one or more wireless devices.

At block 204 it may be determined whether to offload mobile data operations to a micro-cell access point that corresponds to the micro-cell based on the micro-cell performance parameter. In some embodiments, the offloading may be performed according to the description given above.

Accordingly, the method 200 may be performed to determine whether or not to offload mobile data operations to a micro-cell associated with a mobile communication system. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the micro-cell may be a first micro-cell, the micro-cell access point may be a first micro-cell access point, the micro-cell performance parameter may be a first micro-cell performance parameter, and the method 200 may further include offloading the mobile data operations to the first micro-cell access point from a second micro-cell access point of the mobile communications system based on one or more of the first micro-cell performance parameter and a second micro-cell performance parameter associated with a second micro-cell that corresponds to the second micro-cell. In these or other embodiments, the method 200 may include offloading the mobile data operations from a macro-cell access point to the micro-cell access point based on the micro-cell performance parameter, wherein the macro-cell access point corresponds to a macro-cell that includes the micro-cell.

Additionally, in some embodiments, the method 200 may include determining a macro-cell service performance parameter associated with a macro-cell of the mobile communication system and determining whether to offload the mobile data operations from a macro-cell access point that corresponds to the macro-cell to the micro-cell access point based on one or more of the micro-cell performance parameter and the macro-cell performance parameter. In these or other embodiments, the method 200 may include determining whether to offload the mobile data operations based on a comparison between the micro-cell performance parameter and the macro-cell performance parameter. Further, the method 200 may include determining not to offload the mobile data operations from the macro-cell access point to the micro-cell access point based on the comparison between the macro-cell performance parameter and the micro-cell performance parameter indicating a better quality of service in the macro-cell than in the micro-cell.

The macro-cell performance parameter may include one or more of: a quality of communications between the macro-cell access point and one or more wireless devices, a number of wireless devices being serviced by the macro-cell access point, an overall capacity of the macro-cell access point, a signal to noise ratio (SNR) of macro-cell communications between the macro-cell access point and the one or more wireless devices, and a latency associated with macro-cell communications between the macro-cell access point and the one or more wireless devices.

Further, the method 200 may include receiving one or more of the micro-cell performance parameter and the macro-cell performance parameter from one or more of a wireless device and a performance sensor. In addition, the method 200 may include monitoring one or more of control plane communications and data plane communications to determine the micro-cell latency. In some embodiments, the control plane communications may include Extensible Authentication Protocol (EAP) messages. In these or other embodiments, the data plane communications include Address Resolution Protocol (ARP) pinging messages.

As indicated above, the embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. As mentioned above, and by way of example and not limitation, such computer-readable media may include tangible computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a special purpose or general purpose computer. Combinations of the above may also be included within the scope of computer-readable media.

Computer-executable instructions may include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The invention claimed is:

1. A method comprising:
   obtaining, by a computing system of the wireless communication service provider, a micro-cell performance parameter associated with a micro-cell of a mobile communication system;
   obtaining, by the computing system of the wireless communication service provider, a macro-cell performance parameter associated with a macro-cell of the mobile communication system, the macro-cell including the micro-cell, and the macro-cell performance parameter including one or both of: (i) a number of wireless devices being serviced by a macro-cell access point that corresponds to the macro-cell and (ii) an overall capacity of the macro-cell access point;
   determining, by the computing system of the wireless communication service provider, whether performance of mobile data operations by a wireless device connected to the macro-cell improves when performed via the micro-cell instead of the macro-cell, the determining based on a comparison between the micro-cell performance parameter and the macro-cell performance parameter, and the improved performance of the mobile data operations indicates a better quality of service at the wireless device; and
   in response to the determining, directing, by the computing system of the wireless communication service provider, the macro-cell access point and a micro-cell access point corresponding to the micro-cell such that the mobile data operations for the wireless device are performed by the macro-cell access point and not offloaded to the micro-cell access point while the wireless device is connected to the micro-cell access point.

2. The method of claim 1, wherein the micro-cell is a first micro-cell, the micro-cell access point is a first micro-cell access point, the micro-cell performance parameter is a first micro-cell performance parameter, and the method further comprises offloading the mobile data operations to the first micro-cell access point from a second micro-cell access point of the mobile communications system based on one or more of the first micro-cell performance parameter and a second micro-cell performance parameter associated with a second micro-cell that corresponds to the second micro-cell.

3. The method of claim 1, further comprising:
   based on an updated micro-cell performance parameter, offloading the mobile data operations from the macro-cell access point to the micro-cell access point; and
   causing the micro-cell access point to perform the mobile data operations.

4. The method of claim 3, wherein offloading the mobile data operations from the macro-cell access point to the micro-cell access point is based on the macro-cell performance parameter.

5. The method of claim 4, wherein the macro-cell performance parameter further includes one or more of: a quality of communications between the macro-cell access point and the wireless device, a signal to noise ratio (SNR) of macro-cell communications between the macro-cell access point and the wireless device, and a latency associated with macro-cell communications between the macro-cell access point and the wireless device.

6. The method of claim 4, wherein the micro-cell performance parameter includes a micro-cell latency and the macro-cell performance parameter includes a macro-cell latency.

7. The method of claim 4, further comprising receiving one or more of the micro-cell performance parameter and the macro-cell performance parameter from one or more of the wireless device and a performance sensor.

8. The method of claim 1, wherein the micro-cell performance parameter includes a micro-cell latency.

9. The method of claim 8, further comprising monitoring one or more of control plane communications and data plane communications to determine the micro-cell latency.

10. The method of claim 9, wherein the control plane communications include Extensible Authentication Protocol (EAP) messages.

11. The method of claim 9, wherein the data plane communications include Address Resolution Protocol (ARP) pinging messages.

12. The method of claim 8, further comprising subtracting a wired latency from the micro-cell latency to determine a wireless latency of the micro-cell latency.

13. The method of claim 1, wherein the micro-cell performance parameter includes one or more of: a quality of communications between the micro-cell access point and the wireless device, a number of wireless devices being serviced by the micro-cell access point, an overall capacity of the micro-cell access point, a signal to noise ratio (SNR) of micro-cell communications between the micro-cell access point and the wireless device, and a latency associated with micro-cell communications between the micro-cell access point and the wireless device.

14. A system comprising:
   a processor; and
   a computer-readable storage medium including computer executable instructions configured to cause the processor to perform operations, the operations comprising:
   obtaining, by a computing system of the wireless communication service provider, a micro-cell performance parameter associated with a micro-cell of a mobile communication system;
   obtaining, by the computing system of the wireless communication service provider, a macro-cell performance parameter associated with a macro-cell of the mobile communication system, the macro-cell including the micro-cell, and the macro-cell performance parameter including one or both of: (i) a number of wireless devices being serviced by a macro-cell access point that corresponds to the macro-cell and (ii) an overall capacity of the macro-cell access point;
   determining, by the computing system of the wireless communication service provider, whether performance of mobile data operations by a wireless device connected to the macro-cell improves when performed via the micro-cell instead of the macro-cell, the determining based on a comparison between the micro-cell performance parameter and the macro-cell performance parameter, and the improved performance of the mobile data operations indicates a better quality of service at the wireless device; and
   in response to the determining, directing, by the computing system of the wireless communication service provider, the macro-cell access point and a micro-cell access point corresponding to the micro-cell such that the mobile data operations for the wireless device are performed by the macro-cell access point and not offloaded to the micro-cell access point while the wireless device is connected to the micro-cell access point.

15. The system of claim 14, wherein the micro-cell is a first micro-cell, the micro-cell access point is a first micro-cell access point, the micro-cell performance parameter is a first micro-cell performance parameter, and the operations further comprise offloading the mobile data operations to the first micro-cell access point from a second micro-cell access point of the mobile communications system based on one or more of the first micro-cell performance parameter and a second micro-cell performance parameter associated with a second micro-cell that corresponds to the second micro-cell.

16. The system of claim 14, wherein the operations further comprise:
based on an updated micro-cell performance parameter, offloading the mobile data operations from the macro-cell access point to the micro-cell access point based on the micro-cell performance parameter; and
causing the micro-cell access point to perform the mobile data operations.

17. The system of claim 16, wherein offloading the mobile data operations from the macro-cell access point to the micro-cell access point is based on the macro-cell performance parameter.

18. The system of claim 17, wherein the macro-cell performance parameter includes one or more of: a quality of communications between the macro-cell access point and the wireless device, a signal to noise ratio (SNR) of macro-cell communications between the macro-cell access point and the wireless device, and a latency associated with macro-cell communications between the macro-cell access point and the wireless device.

19. The system of claim 17, wherein the micro-cell performance parameter includes a micro-cell latency and the macro-cell performance parameter includes a macro-cell latency.

20. The system of claim 17, wherein the operations further comprise receiving one or more of the micro-cell performance parameter and the macro-cell performance parameter from one or more of the wireless device and a performance sensor.

21. The system of claim 14, wherein the micro-cell performance parameter includes a micro-cell latency.

22. The system of claim 21, wherein the operations further comprise monitoring one or more of control plane communications and data plane communications to determine the micro-cell latency.

23. The system of claim 22, wherein the control plane communications include Extensible Authentication Protocol (EAP) messages.

24. The system of claim 22, wherein the data plane communications include Address Resolution Protocol (ARP) pinging messages.

25. The system of claim 21, wherein the operations further comprise subtracting a wired latency from the micro-cell latency to determine a wireless latency of the micro-cell latency.

26. The system of claim 14, wherein the micro-cell performance parameter includes one or more of: a quality of communications between the micro-cell access point and the wireless device, a number of wireless devices being serviced by the micro-cell access point, an overall capacity of the micro-cell access point, a signal to noise ratio (SNR) of micro-cell communications between the micro-cell access point and the wireless device, and a latency associated with micro-cell communications between the micro-cell access point and the wireless device.

27. A computer-readable storage medium including computer executable instructions configured to cause a system to perform operations, the operations comprising:
obtaining, by a computing system of the wireless communication service provider, a micro-cell performance parameter associated with a micro-cell of a mobile communication system;
obtaining, by the computing system of the wireless communication service provider, a macro-cell performance parameter associated with a macro-cell of the mobile communication system, the macro-cell including the micro-cell, and the macro-cell performance parameter including one or both of: (i) a number of wireless devices being serviced by a macro-cell access point that corresponds to the macro-cell and (ii) an overall capacity of the macro-cell access point;
determining, by the computing system of the wireless communication service provider, whether performance of mobile data operations by a wireless device connected to the macro-cell improves when performed via the micro-cell instead of the macro-cell, the determining based on a comparison between the micro-cell performance parameter and the macro-cell performance parameter, and the improved performance of the mobile data operations indicates a better quality of service at the wireless device; and
in response to the determining, directing, by the computing system of the wireless communication service provider, the macro-cell access point and a micro-cell access point corresponding to the micro-cell such that the mobile data operations for the wireless device are performed by the macro-cell access point and not offloaded to the micro-cell access point while the wireless device is connected to the micro-cell access point.

28. The computer-readable storage medium of claim 27, wherein the micro-cell is a first micro-cell, the micro-cell access point is a first micro-cell access point, the micro-cell performance parameter is a first micro-cell performance parameter, and the operations further comprise offloading the mobile data operations to the first micro-cell access point from a second micro-cell access point of the mobile communications system based on one or more of the first micro-cell performance parameter and a second micro-cell performance parameter associated with a second micro-cell that corresponds to the second micro-cell.

29. The computer-readable storage medium of claim 27, wherein the operations further comprise:
based on an updated micro-cell performance parameter, offloading the mobile data operations from the macro-cell access point to the micro-cell access point; and
causing the micro-cell access point to perform the mobile data operations.

30. The computer-readable storage medium of claim 29, wherein offloading the mobile data operations from the macro-cell access point to the micro-cell access point is based on the macro-cell performance parameter.

31. The computer-readable storage medium of claim 30, wherein the macro-cell performance parameter includes one or more of: a quality of communications between the macro-cell access point and the wireless device, a signal to noise ratio (SNR) of macro-cell communications between the macro-cell access point and the wireless device, and a latency associated with macro-cell communications between the macro-cell access point and the wireless device.

32. The computer-readable storage medium of claim 30, wherein the micro-cell performance parameter includes a micro-cell latency and the macro-cell performance parameter includes a macro-cell latency.

33. The computer-readable storage medium of claim 30, wherein the operations further comprise receiving one or more of the micro-cell performance parameter and the macro-cell performance parameter from one or more of the wireless device and a performance sensor.

34. The computer-readable storage medium of claim 27, wherein the micro-cell performance parameter includes a micro-cell latency.

35. The computer-readable storage medium of claim 34, wherein the operations further comprise monitoring one or more of control plane communications and data plane communications to determine the micro-cell latency.

36. The computer-readable storage medium of claim 35, wherein the control plane communications include Extensible Authentication Protocol (EAP) messages.

37. The computer-readable storage medium of claim 35, wherein the data plane communications include Address Resolution Protocol (ARP) pinging messages.

38. The computer-readable storage medium of claim 35, wherein the operations further comprise subtracting a wired latency from the micro-cell latency to determine a wireless latency of the micro-cell latency.

39. The computer-readable storage medium of claim 27, wherein the micro-cell performance parameter includes one or more of: a quality of communications between the micro-cell access point and the wireless device, a number of wireless devices being serviced by the micro-cell access point, an overall capacity of the micro-cell access point, a signal to noise ratio (SNR) of micro-cell communications between the micro-cell access point and the wireless device, and a latency associated with micro-cell communications between the micro-cell access point and the wireless device.

* * * * *